Sept. 20, 1932.  P. PASHOLK  1,878,535
ROTARY DISK VALVE
Filed Jan. 10, 1931  3 Sheets-Sheet 3
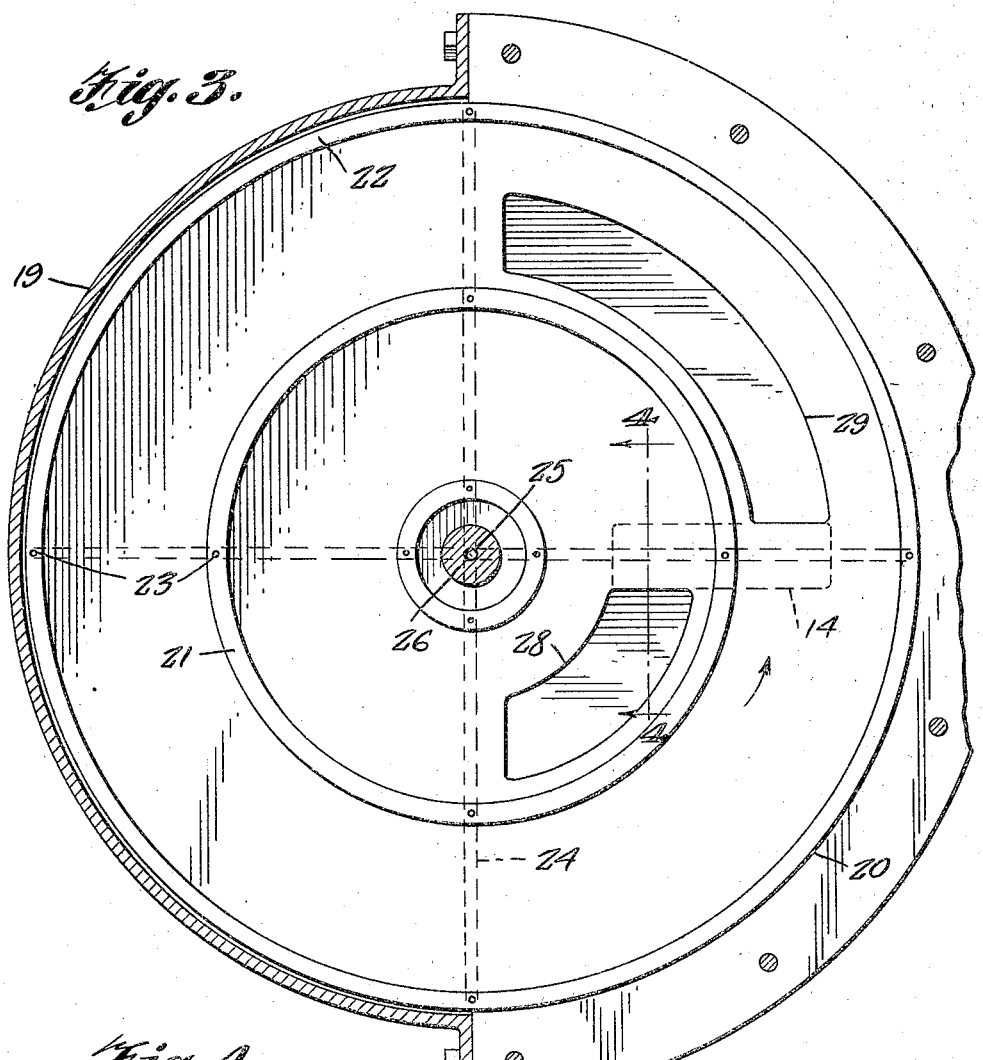
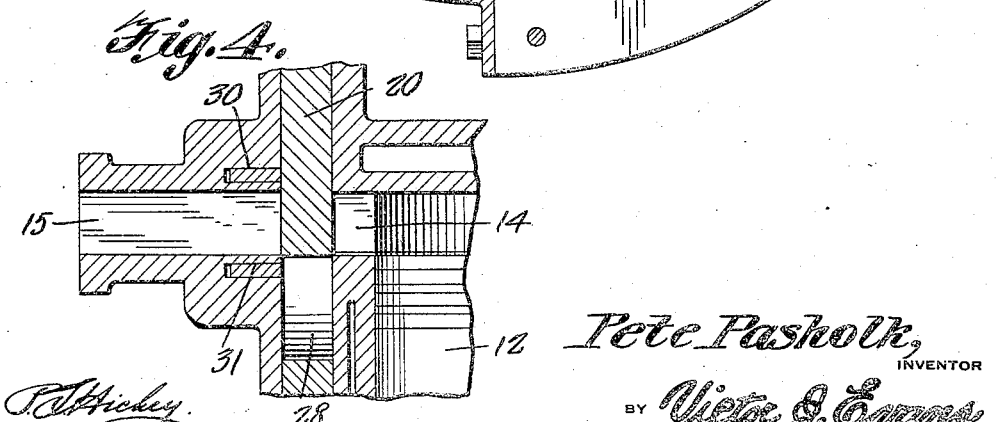

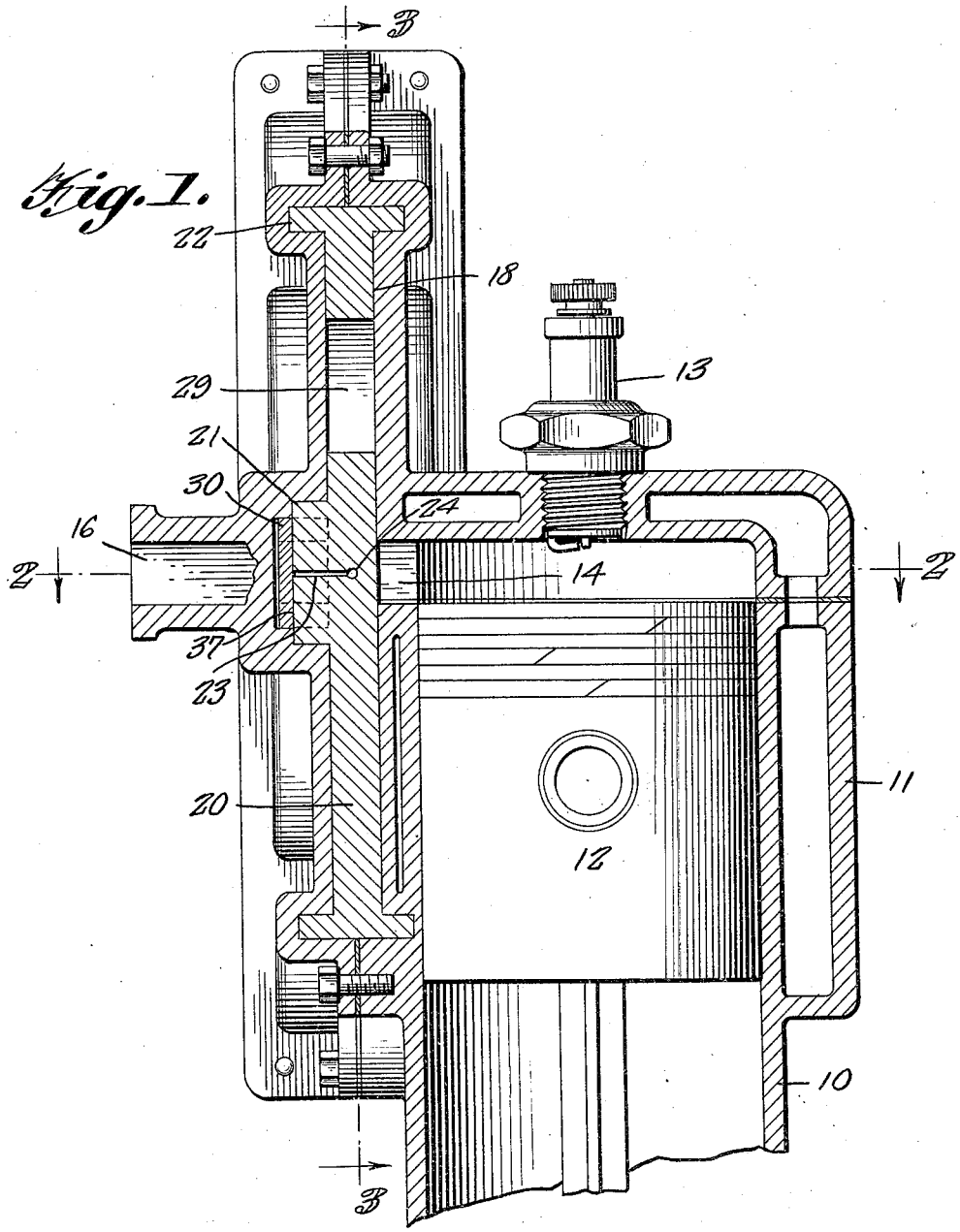

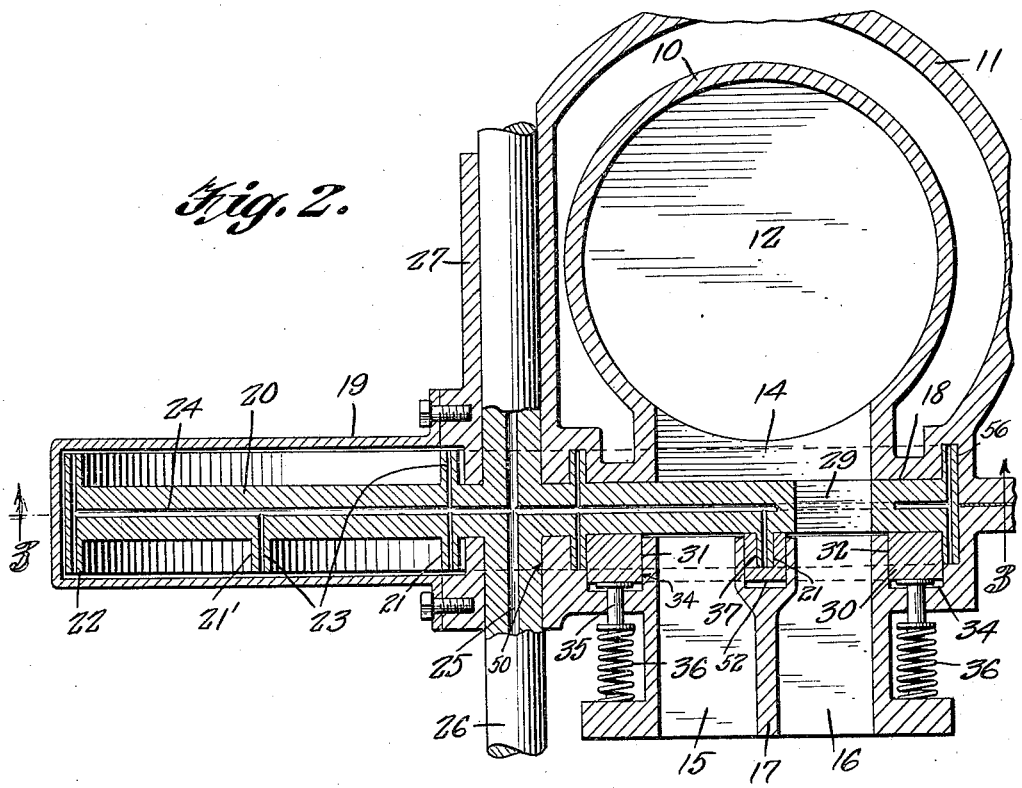

Patented Sept. 20, 1932

1,878,535

UNITED STATES PATENT OFFICE

PETE PASHOLK, OF ROTHSCHILD, WISCONSIN

ROTARY DISK VALVE

Application filed January 10, 1931. Serial No. 507,947.

This invention relates to improvements in engines and has particular relation to valves for controlling the fuel intake and exhaust ports of the engine.

An object of the present invention is the provision of a valve which will control both the intake and exhaust ports, and which will be in the form of a rotary disk suitably driven and timed with respect to the piston of the engine, whereby the working parts of the valve and its mechanism will be materially reduced and valve vibration eliminated.

Another object of the invention is the provision of means for effectually lubricating the valve and contiguous parts, so that wear due to friction will be reduced to a minimum.

Another object of the invention is the provision of novel means for mounting the valve and for providing a compression-proof contact with the valve seat.

With the above and other objects in view, the invention further includes the following novel features and details of construction, to be hereinafter more fully described, illustrated in the accompanying drawings and pointed out in the appended claim.

In the drawings:—

Figure 1 is a vertical sectional view through a portion of the cylinder of an internal combustion engine with the invention applied.

Figures 2 and 3 are sectional views taken respectively on the lines 2—2 and 3—3 of Figure 1.

Figure 4 is a fragmentary section on the line 4—4 of Figure 3.

Figure 5 is a detail perspective view of the packing member.

Referring to the drawings in detail wherein like characters of reference denote corresponding parts, the reference character 10 indicates a portion of an engine cylinder and 11 the water jacket, while the piston is indicated at 12 and the spark plug at 13.

Communicating with the interior of the cylinder 10 through a common port 14, are intake and exhaust ports 15 and 16 respectively. These ports are divided by a partition 17 and may be suitably connected with a source of fuel supply and an exhaust manifold.

Extending transversely of the ports between the inner ends of the ports 15 and 16 and the adjacent end of the port 14, is a valve chamber 18. This chamber is extended as shown at 19 and accommodates a rotary disk valve 20. This valve is provided with spaced inner, outer and intermediate ring flanges 21, 22 and 21' respectively, and these flanges are provided with lubricating passages 23 which communicate with passages 24 which extend diametrically through the valve. These passages 24 in turn communicate with a passage 25 which extends axially of a shaft 26 which is rotatable in bearings 27 arranged concentrically with the valve casing, so that the shaft 26 extends transversely through the casing. By reference to Figure 2 of the drawings it will be seen that the inner ring flange 21 and the outer ring flange 22 extend laterally from the opposite sides of the valve 20 and that the inner ring flange 21 is received in circular depressions 50 on the inner face of the valve casing, the said depressions 50 communicating with the inwardly extending bosses on the guides for the shaft 26.

The valve 20 is provided with spaced ports 28 and 29, and these ports are arranged concentrically with respect to the axial center of the valve. The port 28 is adapted to be moved into and out of communication with the intake port 15 while the port 29 is adapted to be moved into and out of communication with the port 16 when the valve 20 is rotated. Any suitable means may be provided for rotating the valve and its operation is properly timed with respect to the operation of the piston 12 so that the ports will open and close at the proper periods.

In order to provide a leakproof seat for the valve 20 around the ports 15 and 16, the invention provides a packing block member 30 which is provided with spaced openings 31 and 32. In close proximity to the intake and exhaust ports 15 and 16 the casing is provided with lateral and longitudinal communicating recesses or depressions 34 for the reception of the sides and ends of the packing block, while the partition 17 has its upper portion widened and formed with a transverse depression 52 to receive therein the transverse wall 53 provided by the spaced openings 31 and 32 in the block. The block has a transverse arcuate groove 37 therethrough, in which is received the intermediate ring flange 21', while the inner ring flange 21 is in contact with the concaved end wall 54 of the block, the second and arched concaved end 55 of the packing block being contacted by the outer ring flange 22. The casing 11 is provided with a suitable curved groove 56 in which the oppositely extending portion of the flange 22 is received and guided. Headed pins 35 bear against one face of the packing member 30 and these pins are yieldingly urged inward by means of springs 36. The member 30 thus forms a seat for the valve 20 and prevents loss of compression. Wear, due to the operation of the valve 20 is taken up by the springs 36, but this wear is reduced to a minimum by the manner of lubricating the parts.

The valve casing 19 is of sectional formation and may be readily taken apart so that access may be had to the interior of the valve chamber.

The invention is susceptible of various changes in its form, proportions and minor details of construction and the right is herein reserved to make such changes as properly fall within the scope of the appended claim.

Having described the invention what is claimed is:—

In an engine, a cylinder having intake and exhaust passages, a wall dividing the passages, and a flat valve chamber disposed transversely of said passages, a shaft journaled for rotation transversely of the valve chamber, a disk valve operated by the shaft, said disk valve having inner, outer and intermediate ring flanges provided with oil ports and the said valve and shaft having oil passages which communicate with the ports, said valve chamber having transverse and longitudinal communicating depressions disposed in a line with the inner and outer ring flanges, the wall between the intake and exhaust passages having an inner widened portion which is recessed transversely to communicate with the longitudinal passages of the valve chamber depressions and in which recess the intermediate flange is received, a packing block member having parallel sides and having one of its ends concaved and its other end convexed, and having spaced openings to register with the intake and exhaust passages when the block is received in the valve chamber depressions, the partition dividing the openings in the block being received in the depression in the wall between the intake and exhaust passages and said partition having an arcuate slot to receive therein the intermediate ring flange of the valve, and spring means influencing the block against the valve.

In testimony whereof I affix my signature.

PETE PASHOLK.